(12) United States Patent
Murakami et al.

(10) Patent No.: US 9,174,416 B2
(45) Date of Patent: Nov. 3, 2015

(54) ALLOY POWDER FOR OXIDATION-RESISTANT COATING, AND ALLOY MATERIAL FORMED OF THE POWDER AND EXCELLENT IN OXIDATION RESISTANCE CHARACTERISTICS

(71) Applicant: NATIONAL INSTITUTE FOR MATERIALS SCIENCE, Ibaraki (JP)

(72) Inventors: Hideyuki Murakami, Ibaraki (JP); Daishi Ohtsubo, Ibaraki (JP); Yoko Mitarai, Ibaraki (JP); Makoto Nanko, Niigata (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 233 days.

(21) Appl. No.: 13/851,324

(22) Filed: Mar. 27, 2013

(65) Prior Publication Data

US 2014/0072827 A1 Mar. 13, 2014

(30) Foreign Application Priority Data

Sep. 12, 2012 (JP) .................................. 2012-200656

(51) Int. Cl.
| | | |
|---|---|---|
| C23C 16/00 | (2006.01) |
| B32B 15/01 | (2006.01) |
| B22F 1/02 | (2006.01) |
| C22C 1/10 | (2006.01) |
| C22C 32/00 | (2006.01) |
| C22C 5/04 | (2006.01) |
| C22C 19/03 | (2006.01) |
| C22C 21/00 | (2006.01) |

(52) U.S. Cl.
CPC ................. B32B 15/018 (2013.01); B22F 1/02 (2013.01); C22C 1/1084 (2013.01); C22C 1/1094 (2013.01); C22C 5/04 (2013.01); C22C 19/03 (2013.01); C22C 21/00 (2013.01); C22C 32/0015 (2013.01); B22F 2999/00 (2013.01); Y10T 428/1275 (2015.01); Y10T 428/12875 (2015.01)

(58) Field of Classification Search
CPC .............. B22F 7/04; B22F 1/02; C23C 10/48
USPC .................................................... 427/253, 250
See application file for complete search history.

(56) References Cited

U.S. PATENT DOCUMENTS 3,801,357 A * 4/1974 Baldi ............................ 427/250

FOREIGN PATENT DOCUMENTS

| JP | 02-186579 | * | 1/1989 |
| JP | 2008027870 A | * | 2/2008 |

OTHER PUBLICATIONS

Bianco et al. Codepositing Elements by Halide Activated Pack Cementation, JOM, vol. 43, No. 11, Nov. 1991, p. 20-25.*
Wu et al. Cyclic Oxidation Behavior of Iridium-Modified Aluminide Coatings for Nickel-Base Single Crystal Superalloy TMS-75, Materials Transactions, vol. 44 No. 9 (2003) pp. 1675-1678.*
Z. Bao et al., "Heat-resistance Materials", Abstract of the 147 annual meeting of the Japan Institute of Metals and Materials (717), Mar. 2012, p. 404 (with English translation).

* cited by examiner

*Primary Examiner* — Kelly M Gambetta
(74) *Attorney, Agent, or Firm* — Wenderoth, Lind & Ponack, L.L.P.

(57) ABSTRACT

A mixed powder of an Ni—Al alloy and alumina is produced by heating a first mixed powder, which is prepared by mixing an Ni—Al mixed powder as prepared by mixing an Al powder with Ni in such a manner that Al therein could fall within a range of from 25 atomic % to 60 atomic %, and an alumina powder in a range of from 40% by mass to 60% by mass, in vacuum or in an inert gas atmosphere at a temperature falling within a range of from 600° C. to 1300° C. for at least 1 hour, and then grinding the resulting product.

1 Claim, 9 Drawing Sheets

ALLOY POWDER FOR OXIDATION-RESISTANT COATING, AND ALLOY MATERIAL FORMED OF THE POWDER AND EXCELLENT IN OXIDATION RESISTANCE CHARACTERISTICS

BACKGROUND OF THE INVENTION

1. Field of the Invention

The present invention relates to coating powder for use for production of a high-temperature Ir-based alloy material or Ru-based alloy material having excellent high-temperature oxidation resistance, and to an alloy material formed with the powder which has excellent oxidation resistance characteristics.

2. Description of Related Art

Ir (iridium) or Ru (ruthenium) is a metal excellent in high-temperature strength and corrosion resistance and is expected to be used as a structural material for use in ultimate environments, and is used, for example, as crucibles for growth of single crystals for optical devices and as automobile engine plugs.

However, these metals form oxides $IrO_3$ and $RuO_3$ in a high-temperature oxidation atmosphere, and the sublimation points of these oxides are lower than the sublimation points of the metals, that is, it the sublimation point of $IrO_3$ is 1092° C. and that of $RuO_3$ is 1200° C. Accordingly, there is a problem in that Ir or Ru could not be used at the temperature of 1100° C. or higher in an oxidative atmosphere. As a method for solving the problem, a method of coating the metal surface with an $Al_2O_3$ (alumina) coating film of an oxidation-resistant material was employed. However, since the metal surface and alumina differ in point of the crystal structure and the lattice constant, the $Al_2O_3$ layer readily peel off from each other, and direct coating with alumina is ineffective as an oxidation-resistant coating film.

There has been tried a method of directly reacting Al (aluminum) with the surface of an Ir-based alloy or Ru-based alloy through aluminization. However, in reaction of Al with an Ir-based alloy or Ru-based alloy, molten Al explosively reacts with Ir or Ru at a temperature of the melting point of Al or higher, and therefore the formed film could not have a suitably controlled structure as an oxidation-resistant protective coating film. Given the situation, the present inventors have proposed a production method for a high-temperature material through aluminization of an Ir-based alloy or Ru-based alloy in WO2012/033160, in which an Fe—Al alloy powder or an Ni—Al composite powder is used for controlling the activity of Al.

In the production method proposed in WO2012/033160, IrAl or RuAl is formed on the surface of an Ir-based alloy or Ru-based alloy. However, later investigations have revealed that in case where an Fe—Al alloy powder is used, an Fe segregation phase is easy to form in the interface between the Ir-based alloy or Ru-based alloy and the IrAl film or RuAl film. Fe (ferrum or iron) rapidly diffuses in the Ir-based alloy or Ru-based alloy often to lower the alloy strength in use at high temperatures or often worsen the heat resistance of the IrAl film or RuAl film. Consequently, it is desirable to aluminize with no use of an Fe—Al alloy powder. However, an Ni—Al composite powder is poorly active since Ni is coated on the surface of the Al powder therein, and therefore the Ni—Al composite powder alone could hardly form an IrAl film or RuAl film. In addition, for suitably controlling the activity of Al, it is necessary to form an Ni—Al alloy powder in which the Al amount is controlled.

BRIEF SUMMARY OF THE INVENTION

The present invention provides a mixed powder of an Ni—Al alloy and alumina produced by heating a first mixed powder, which is prepared by mixing an Ni—Al mixed powder as prepared by mixing an Al powder with Ni in such a manner that Al therein could fall within a range of from 25 atomic % to 60 atomic %, and an alumina powder in a range of from 40% by mass to 60% by mass, in vacuum or in an inert gas atmosphere at a temperature falling within a range of from 600° C. to 1300° C. for at least 1 hour, and then grinding the resulting product.

The invention also provides the mixed powder of a Ni—Al alloy and alumina, wherein the constituent phases are $Ni_3Al$, NiAl and alumina.

In the present application, "Ni—Al composite powder" means that the surface of the Al powder therein is coated with Ni; and "Ni—Al mixed powder" means that Ni and Al therein are merely mixed but not alloyed. "Ni—Al alloy" means that Ni and Al therein form an intermetallic compound or alloy.

The invention also provides an alloy material of an Ir-based alloy material or Ru-based alloy material of which the surface is uniformly coated with an IrAl intermetallic compound film or RuAl intermetallic compound film, as produced by immersing an Ir-based alloy material or Ru-based alloy material containing at least one of Al, Sc, Ti, V, Cr, Mn, Y, Zr, Nb, Mo, Tc, Hf, Ta, W or Re within a quantitative range within which any precipitation phase does not form, in a second mixed powder prepared by adding a metal or ammonia chloride powder to the above-mentioned mixed powder of an Ni—Al alloy and alumina in an amount falling within a range of from 1% by mass to 6% by mass, at a temperature falling within a range of from 800° C. to 1300° C. for from 2 hours to 6 hours.

Advantage of the Invention

An Ni—Al alloy powder is generally produced by grinding a bulk of an Ni—Al alloy or according to an atomization method; however, the mixed powder of an Ni—Al alloy powder and alumina of the invention can be produced in one stage, in which the Al content of the alloy powder varies. The invention enables significant cost reduction.

The mixed powder of an Ni—Al alloy powder and alumina of the invention does not require further addition of alumina in aluminization, and therefore the production process is significantly simplified.

In the invention, in addition, since the mixed powder of an Ni—Al alloy and alumina alone is used in aluminization, Fe that may lower the strength of the alloy and may worsen the heat resistance of the film does not exist in the interface between the IrAl film or RuAl film and the Ir-based alloy or Ru-based alloy. The IrAl film or RuAl film alone exists on the surface of the Ir-based alloy or Ru-based alloy. Accordingly, the Ir-based alloy or Ru-based alloy hardly deteriorates in point of the strength and the heat resistance thereof even in long-term use at high temperatures.

μm to an Ni—Al mixed powder prepared by mixing a powder of Ni and a powder of Al in a ratio of 1/1, and then heating it up to 1150° C.

Figure 2:
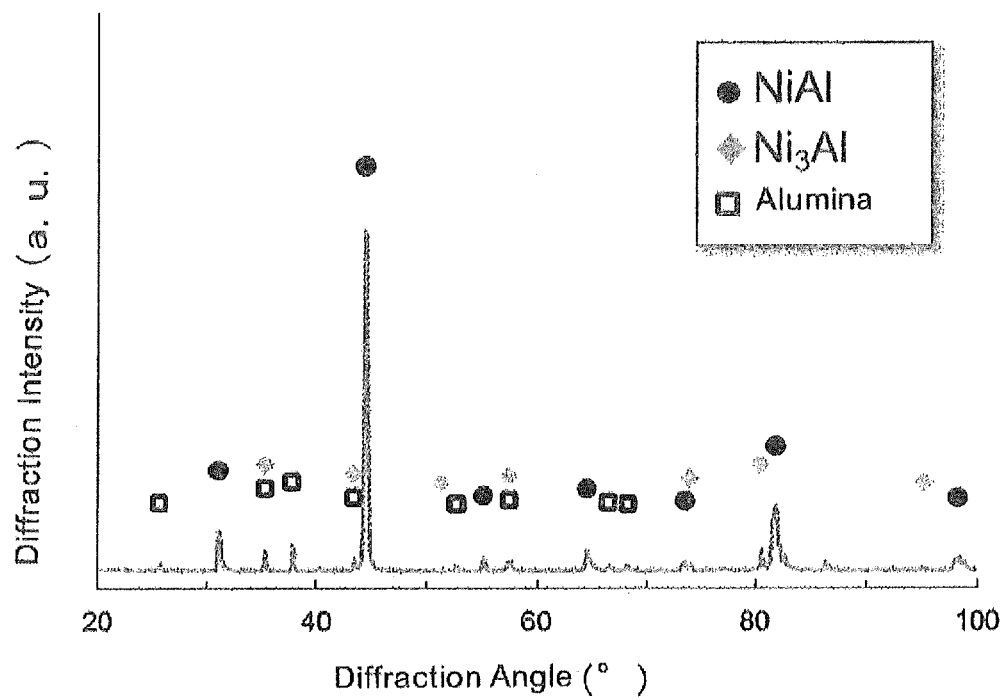

FIG. 2 is an XRD (X-ray diffractometer) analysis result of a powder of the product.

Figure 3:
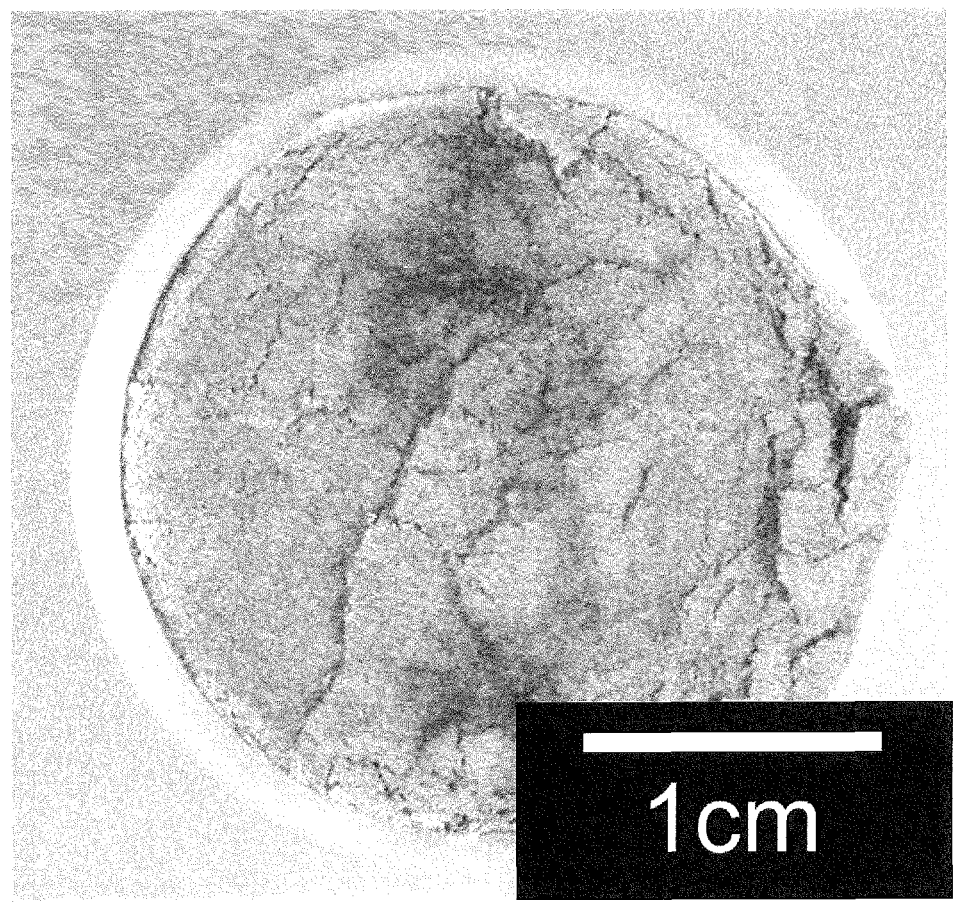

FIG. 3 is a photograph of the product produced by adding an alumina powder having a maximum particle size of 65 μm to an Ni—Al mixed powder prepared by mixing a powder of Ni and a powder of Al in a ratio of 1/1, and then heating it up to 1000° C.

Figure 4:
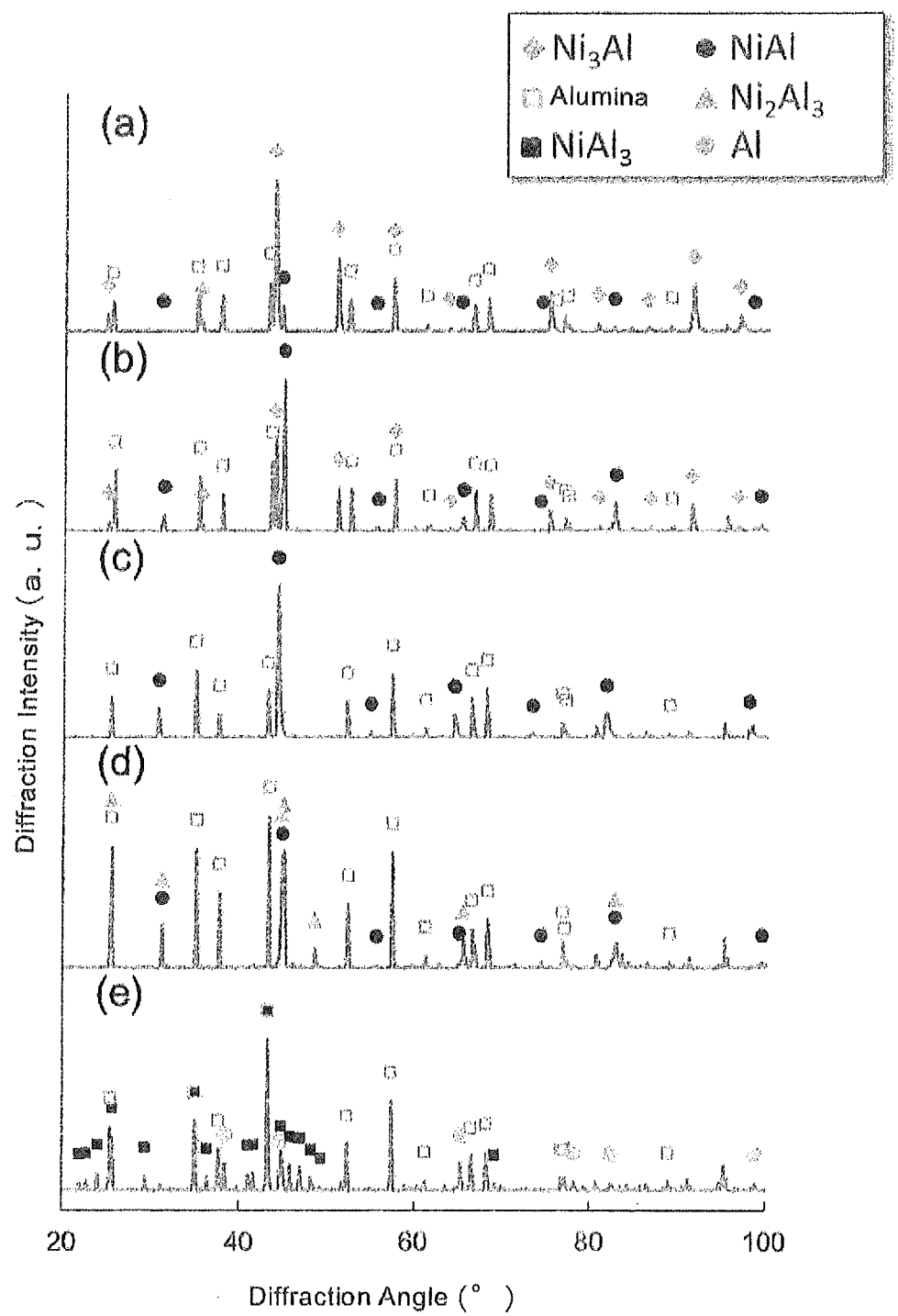

FIG. 4 shows an XRD analysis result of a product using an Ni—Al mixed powder in which the Al ratio is (a) 25 atomic %, (b) 35 atomic %, (c) 50 atomic %, (d) 60 atomic % or (e) 75 atomic %.

Figure 5:
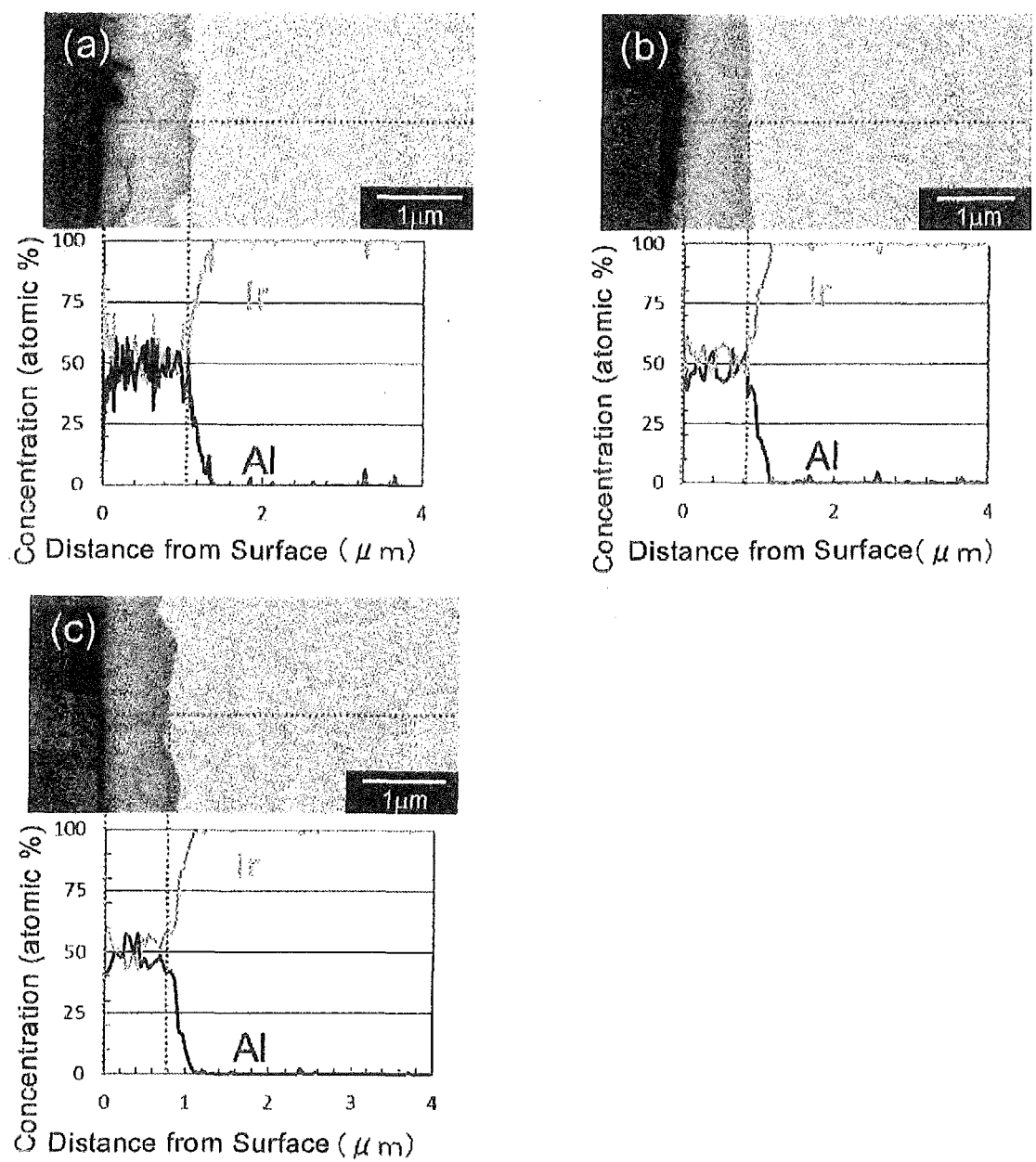

FIG. 5 shows a sectional structure of an Ir-based alloy aluminized with a mixed powder of (a) Ni-25Al (atomic %) alloy, (b) Ni-35Al alloy or (c) Ni-50Al alloy and alumina.

Figure 6:
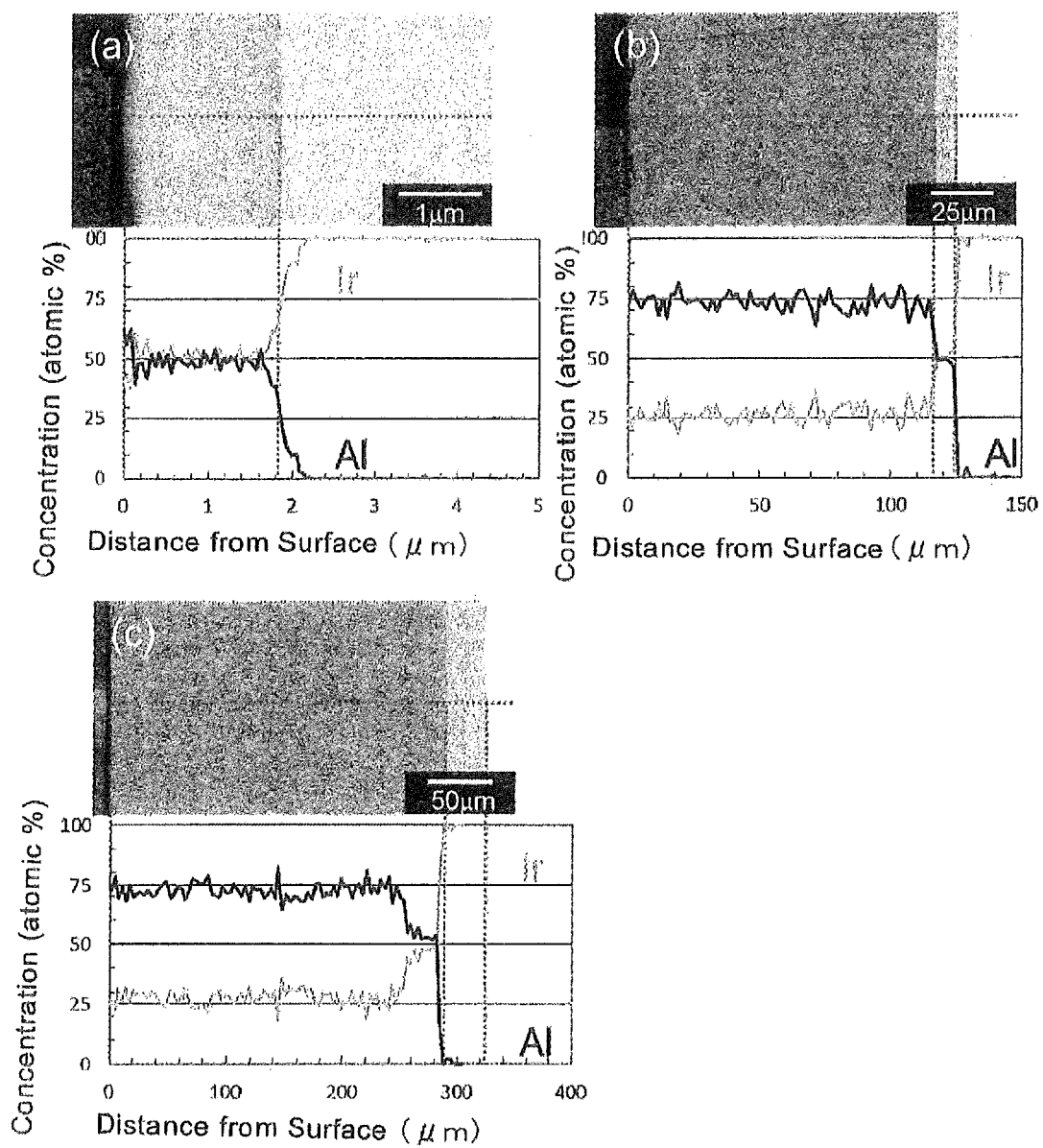

FIG. 6 shows a sectional structure of an Ir-based alloy aluminized with a mixed powder of (a) Ni-50Al (atomic %) alloy, (b) Ni-60Al alloy or (c) Ni-75Al alloy and alumina.

Figure 7:
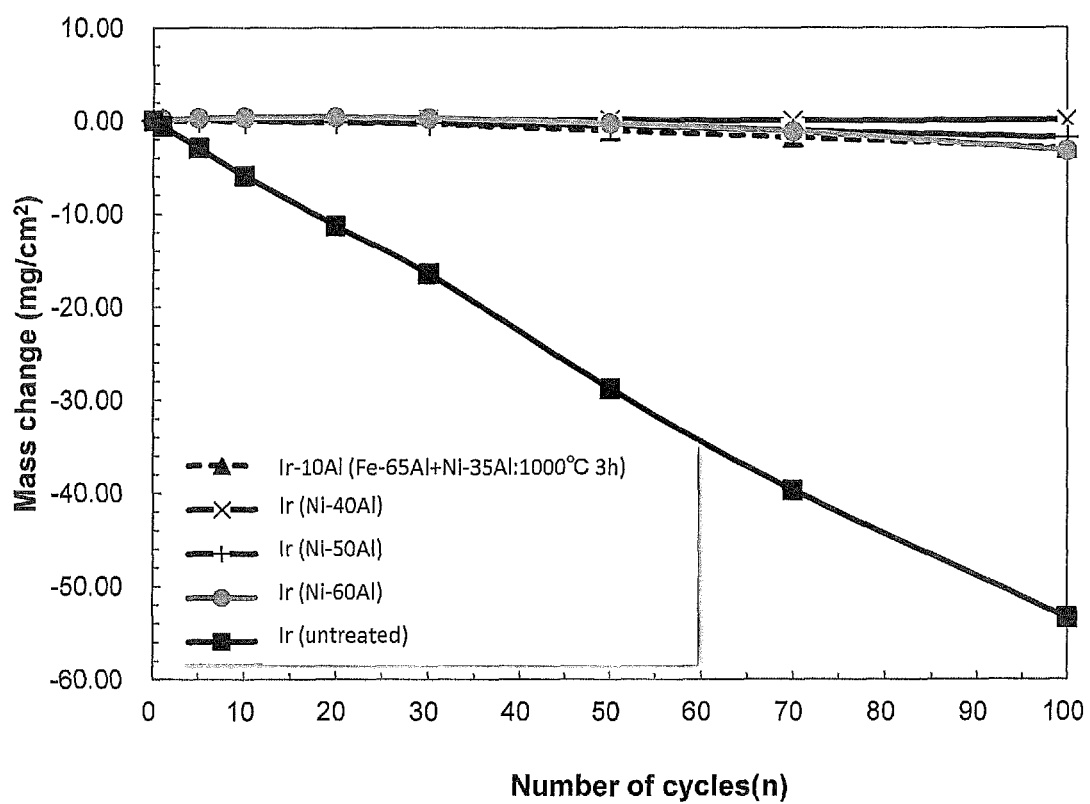

FIG. 7 shows a result of a cyclic oxidation test at 1000° C.

Figure 8:
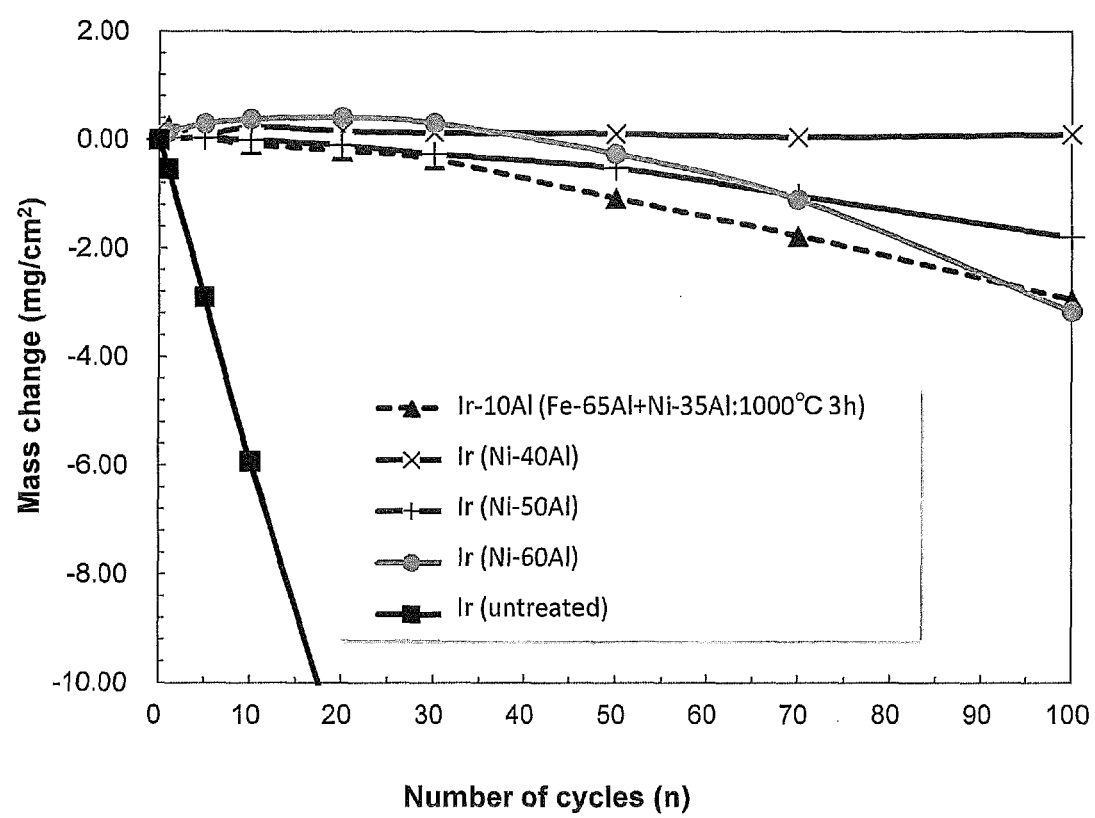

FIG. 8 is an enlarged view of FIG. 7, showing the difference in oxidation-resistant characteristics depending on the aluminization condition.

Figure 9:
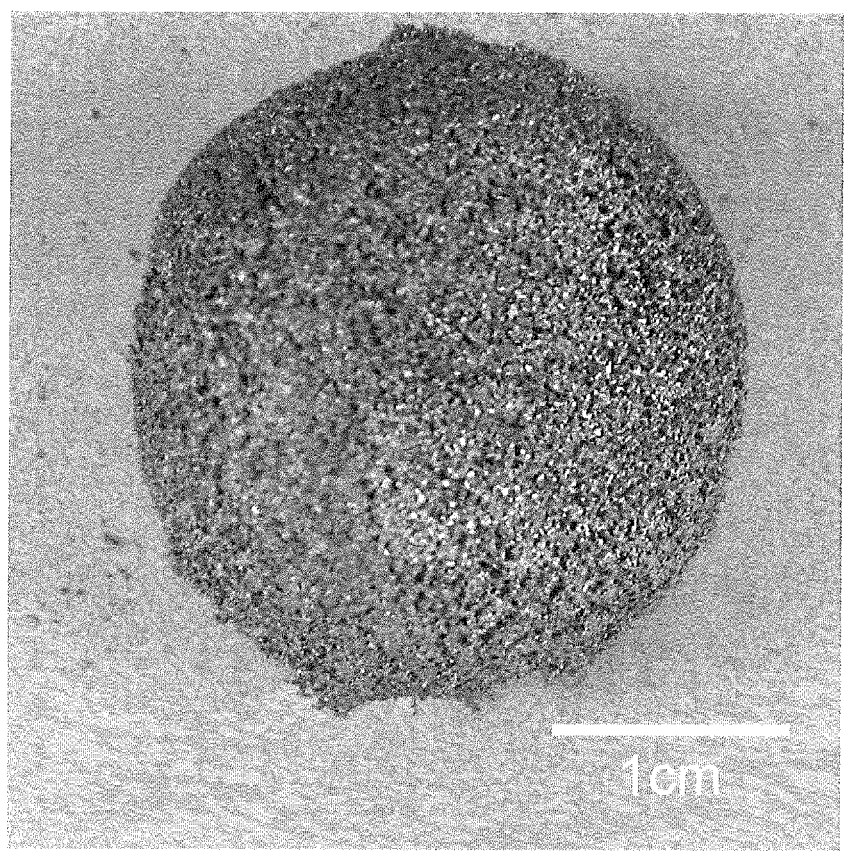

FIG. 9 is a photograph of a product produced by heating a commercially-available Ni—Al composite powder up to 1200° C.

DETAILED DESCRIPTION OF THE INVENTION

In producing the mixed powder of an Ni—Al alloy and alumina, a first mixed powder that is prepared by mixing an Ni—Al mixed powder, as prepared by mixing an Al powder with an Ni powder, and an alumina powder is heated in vacuum or in an inert gas atmosphere at a temperature falling within a range of from 600° C. to 1300° C. for at least 1 hour. The mass ratio of the powders is determined for the following reasons.

First, the mixing ratio of the Al powder and the Ni powder is such that the Al amount in the Ni—Al mixed powder falls within a range of from 25 atomic % to 60 atomic %. When the Al amount is less than 25 atomic % relative to the Ni amount, then the Ni content in the Ni—Al alloy powder produced is high. Therefore, the Al activity in aluminization is low and IrAl and RuAl are difficult to form. When the Al amount is more than 60 atomic % relative to the Ni amount, then an Al-rich phase such as Al$_3$Ir or the like may readily form in the coating film. In addition, the film in which the Al content is more than 60 atomic % has a low melting point and is brittle, therefore, when such a film is formed on the surface of the alloy, the alloy is poorly resistant to heat and stress, and for these reasons, the mixed powder of the type is unsuitable as a coating material for high-temperature materials.

Next, the mixing ratio of the Ni—Al mixed powder and the alumina powder is such that the alumina powder content in the first mixed powder is from 40% by mass to 60% by mass. When an Ni—Al mixed powder is heated with no addition of an alumina powder thereto, then an Ni—Al intermetallic compound may form; but in the case with no alumina, explosive heat generation may occur. One reason for the addition of the alumina powder to the Ni—Al mixed powder is for preventing the explosive reaction, and for effective reaction control, the amount of the alumina powder to be added is suitably at least 40% by mass. On the other hand, when the mixing ratio of the alumina powder is more than 60% by mass, then Ni and Al could not react homogeneously even under heat.

The alumina powder to be used for controlling the reaction of Ni and Al is used for aluminization while kept mixed in the mixture. From this viewpoint, the mixing ratio of the alumina powder to the Ni—Al mixed powder is to fall within a range of from 40% by mass to 60% by mass.

The Al concentration in the Ni—Al alloy powder to be formed through heating treatment is preferably within a range of from 25 atomic % to 60 atomic % in total. When the Al concentration is lower than 25 atomic %, then the Al activity is too low and therefore the reaction could not go on effectively. On the other hand, when the concentration is higher than 60 atomic %, then a liquid phase would be formed readily in the Ni—Al alloy powder at the aluminization treatment temperature and, as a result, any other intermetallic compound than IrAl or RuAl would form, and the desired intermetallic compound film would be difficult to form. The particle size of the Ni—Al alloy powder preferably falls within a range of from 5 μm to 100 μm in consideration of the reactivity and the handleability thereof.

Preferably, the constituent phases of the Ni—Al alloy powder are Ni$_3$Al, NiAl and alumina. It is desirable that the other product than alumina that has been added for controlling the activity of Al is NiAl, but the powder may contain Ni$_3$Al in an amount of at most 50% by mass or so. However, when the amount of Ni$_3$Al is more than 50% by mass, then the activity of Al may lower and IrAl or RuAl would be difficult to form.

The Ir-based alloy or the Ru-based alloy to which aluminization is applied using the mixed powder of such an Ni—Al alloy and alumina may contain at least one of Al, Sc, Ti, V, Cr, Mn, Y, Zr, Nb, Mo, Tc, Hf, Ta, W or Re within a quantitative range within which any precipitation phase does not form. The additive elements differ in point of the solubility limit in Ir and Ru; and within the solubilizable range thereof and in accordance with the intended use, at least one of those elements may be added to the Ir-based alloy or Ru-based alloy.

TABLE 1

The unit of the solubility limit is atomic %; and — means that the solubility limit is unknown.

|    | Sc | Ti | V  | Cr | Mn | Y | Zr | Nb | Mo | Tc | Hf | Ta | W  | Re |
|----|----|----|----|----|----|----|----|----|----|----|----|----|----|----|
| Ir | 6  | 10 | 12 | 38 | 40 | 1 | 3  | 11 | 22 | 10 | 5  | 12 | 18 | 25 |
| Ru | 1  | 14 | 30 | 40 | —  | 1 | 1  | 8  | 50 | —  | 3  | 20 | 42 | 50 |

The Ir-based alloy or Ru-based alloy is melted according to an ordinary melting method, then solidified, and the resulting ingot is worked into a predetermined plate, rod or the like according to an ordinary casting and rolling method, and thereafter this is further worked into a desired shape for use through plastic working, cutting or the like.

The surface of the Ir-based alloy material or Ru-based alloy material that has been formed to have a desired shape is coated with an IrAl intermetallic compound film or an RuAl intermetallic compound film through aluminization. The aluminization may be carried out under the condition mentioned below.

The powdery material for use in film formation of the IrAl intermetallic compound film or the RuAl intermetallic compound film through aluminization comprises the following:

(1) The mixed powder of an Ni—Al alloy and alumina as mentioned above, and (2) A reducing agent powder that reduces Al in the Ni—Al alloy powder to produce a vapor-phase Al chloride.

The particle size of each powder is preferably within a range of from 5 μm to 100 μm from the viewpoint of the dispersibility in mixing. On the other hand, however, even when the size is at most 500 μm, the powder is easy to grind.

As the Ni—Al alloy powder and the reducing agent powder disperses uniformly, the alumina powder in the mixed powder of Ni—Al alloy powder and alumina may control the reaction. However, when the blend ratio of the alumina powder is too large, then the reaction would be retarded. Consequently, though depending on the Al concentration (activity) in the Ni—Al alloy, the mass ratio of the Ni—Al alloy powder and the alumina powder is preferably within a range of from 1/0.8 to 1/1.2. The particle size of the alumina powder is preferably within a range of from 5 μm to 100 μm in consideration of the reaction control and the handleability.

The reducing agent includes ammonia and a metal halide such as $NH_4Cl$, NaCl, etc. Especially preferred is a chloride. The amount of the reducing agent powder to be added is preferably within a range of from 1% by mass to 6% by mass. When the amount of the reducing agent powder added is less than 1% by mass, then sufficient $AlCl_x$ (where x is a value of 1, 2 or 3) would be difficult to form; but even when the agent powder is added in an amount of more than 6% by mass, the amount of $AlCl_x$ to be formed would be saturated and such addition would be no more effective.

In general, aluminization is a process of putting a sample and a reducing agent powder in an Al-containing alloy powder and heating them to thereby form an Al compound on the surface of the sample. In case where a chloride is used as the reducing agent, the Al-containing alloy powder is reduced to form an $AlCl_x$ gas that vaporizes at a relatively low temperature. $AlCl_3$ has a sublimation point of 180° C., and the other compounds are more stable when vapor at room temperature. Gaseous $AlCl_x$ supplies Al to the sample surface, and forms an Al compound with Ir or Ru contained in the sample. For producing the $AlCl_x$ gas, a solid-phase Al alloy powder but not a liquid-phase Al is suitable.

The chemical reaction of aluminization goes on as follows to form a desired intermetallic compound. The following reaction is with Ir, but the same shall apply also to Ru, or that is, Ir in the following may be replaced by Ru.

First, the reducing agent decomposes into ammonia and hydrogen chloride.

$NH_4Cl \rightarrow NH_3(g)+HCl(g)$

HCl decomposes the Al alloy powder to give Al and a chloride ([Al] means Al in the alloy).

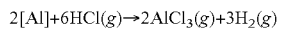
$2[Al]+6HCl(g) \rightarrow 2AlCl_3(g)+3H_2(g)$

The Al chloride reacts with active [Al] to form AlCl.

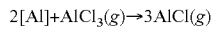
$2[Al]+AlCl_3(g) \rightarrow 3AlCl(g)$

AlCl reacts with Ir on the surface to form IrAl.

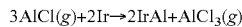
$3AlCl(g)+2Ir \rightarrow 2IrAl+AlCl_3(g)$

The aluminization temperature is preferably within a range of from 800° C. to 1300° C. More preferably, the temperature is within a range of from 900° C. to 1050° C. When the temperature is lower than 800° C., the diffusion would be slow and the reaction would take too much time. On the other hand, when the temperature is higher than 1300° C., then the powder for aluminization would melt and $AlCl_x$ could not be supplied sufficiently.

The time for aluminization depends on the temperature, and within a temperature range of from 900° C. to 1050° C., the time is preferably within a range of from 2 hours to 24 hours. When the time is shorter than 2 hours, then the reaction could not go on sufficiently and the intermetallic compound film could not reach the desired thickness. On the other hand, when the time is longer than 24 hours, then $AlCl_x$ would be exhausted and no more increase in the film thickness could be expected.

The aluminization can be carried out in an inert gas atmosphere under atmospheric pressure, using an electric furnace such as an ordinary muffle furnace of a tubular furnace.

Preferably, the thickness of the IrAl intermetallic compound film or RuAl intermetallic compound film formed through the aluminization falls within a range of from 2 μm to 50 μm. The IrAl intermetallic compound film or RuAl intermetallic compound film is brittle, and therefore, when the thickness thereof is more than 50 μm, then the film may be cracked and may be broken, therefore often losing the function thereof as an oxidation-resistant film. On the other hand, if the thickness is less than 2 μm, then the alumina film to form on the IrAl intermetallic compound film or RuAl intermetallic compound film could not grow uniformly in an oxidative atmosphere and therefore the oxidation resistance of the film would be worsened.

EXAMPLE 1

An Ni powder and an Al powder (mean particle size: 50 μm) were weighed in a ratio of Ni/Al=1/1 (atomic %), and mixed to prepare an Ni—Al mixed powder. An alumina powder (maximum particle size: 500 μm) was added to the Ni—Al mixed powder in the same mass as that of the Ni—Al mixed powder, and mixed to prepare a first mixed powder. In a vacuum heating furnace at a vacuum degree of $2.6 \times 10^{-2}$ Pa, the first mixed powder was heated up to 600° C. at 10° C./min, then from 600° C. to 700° C. at 2° C./min and up to 1150° C. at 10° C./min, and kept at 1150° C. for 5 hours.

Figure 1:
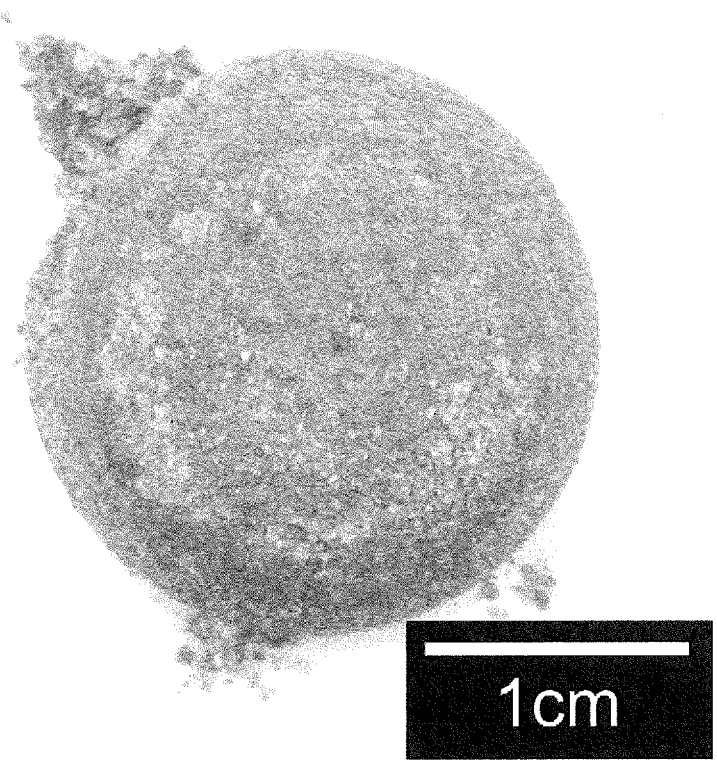
FIG. 1 is a photograph of the product produced by adding an alumina powder having a maximum particle size of 500

FIG. 1 shows a photograph of the obtained product. The obtained product was partly an alloy powder, and could be ground in a mortar. FIG. 2 shows the XRD result of the ground powder. Two types of compounds, $Ni_3Al$ and NiAl formed, the peak of the intermetallic compound NiAl having the same composition as that of the Ni—Al mixed powder was detected highest. This indicates that the amount of the formed NiAl was larger than the amount of the formed $Ni_3Al$.

EXAMPLE 2

Using the same Ni powder and Al powder (mean particle size: 50 μm) as those in Example 1, Ni—Al mixed powders were prepared in which the mixing ratio was so controlled that the Al ratio could be 25 atomic %, 35 atomic %, 50 atomic %, 60 atomic % or 75 atomic %. The same mass of an alumina powder (maximum particle size: 65 μm) was added to each Ni—Al mixed powder to prepare a first mixed powder. In a vacuum heating furnace where Ar was introduced in an amount of 200 ml/min, the powder was heated up to 600° C. at 10° C./min, then from 600 to 700° C. at 2° C./min, and from 700 to 1000° C. at 10° C./min, and then kept heated at 1000° C. for 5 hours.

FIG. 3 shows a photograph of the product taken out of the vacuum heating furnace. When pushed with fingers, the shape of the product broke therefore readily giving a mixed powder. FIG. 4 shows the XRD results of mixed powders each having a different mixing ratio. Of the sample having an Al ratio to Ni of 25 atomic %, the main phase was $Ni_3Al$; but of the sample with the Al ratio of 35 atomic %, the peak intensity of the NiAl phase increased; and of the sample with the Al ratio of 50 atomic %, the main phase was nearly an NiAl single phase. Of the sample with the Al ratio of 60 atomic %, the main phase was $Ni_2Al_3$; and of the sample with the Al ratio of 75 atomic %, the main phase was $NiAl_3$. An intermetallic compound having nearly the same composition as the composition of the mixed powder was formed. Use of the alumina powder confirmed the production of the alloy powder in a more simplified manner.

EXAMPLE 3

In Example 3, a mixed powder of an Ni—Al alloy and alumina was used in aluminization. Pure Ir was immersed in a second mixed powder that had been prepared by adding NH$_4$Cl to the mixed powder of (a) Ni-25 at. % Al alloy, (b) Ni-35 at. % Al alloy or (c) Ni-50 at. % Al alloy and alumina prepared in Example 2, in an amount of 2% by mass, and kept therein at 950° C. for 2 hours. FIG. 5(a), (b), (c) each shows a sectional structure of the aluminized sample. On the surface of each sample, a layer of an IrAl intermetallic compound having a thickness of from 0.74 to 0.92 μm was uniformly and stably formed.

EXAMPLE 4

In Example 4, pure Ir was immersed in a second mixed powder that had been prepared by adding NH$_4$Cl to the mixed powder of (a) Ni-50 at. % Al alloy, (b) Ni-60 at. % Al alloy or (c) Ni-75 at. % Al alloy and alumina prepared in Example 2, in an amount of 2% by mass, and kept therein at 950° C. for 5 hours. FIG. 6(a), (b), (c) each shows a sectional structure of the aluminized sample. On the sample aluminized with the mixed powder of Ni-50 at. % Al alloy and alumina, a layer of an IrAl intermetallic compound having a thickness of 1.5 μm was uniformly and stably formed. On the sample aluminized with the mixed powder of Ni-60 at. % Al alloy and alumina, a layer of an IrAl intermetallic compound having a thickness of 10 μm was formed, and outside the layer, a layer of an intermetallic compound IrAl$_{2.75}$ having a thickness of 155 μm was formed. On the sample aluminized with the mixed powder of Ni-75 at. % Al alloy and alumina, a layer of an IrAl intermetallic compound having a thickness of 36 μm was formed, and outside the layer, a layer of an intermetallic compound IrAl$_{2.75}$ having a thickness of 541 μm was formed The sample aluminized with the mixed powder of Ni—Al alloy and alumina prepared in Example 2 was put into a furnace at 1000° C., kept therein for 1 hour, and taken out of the furnace. The cycle was repeated 100 times, and the oxidation mass loss behavior of the sample is shown in FIG. 7. In the graph, the pure Ir not aluminized on the surface thereof, as shown by black squares, wore during the oxidation test. This is because Ir oxidized to form an Ir oxide on the surface thereof, and theft oxide having a sublimation point of 1092° C. evaporated away. On the other hand, the surface-aluminized Ir wore little after 100 cycles. This is because an intermetallic compound formed on the surface of the sample through aluminization, and stable alumina formed on the surface thereof in the oxidative atmosphere, whereby the oxidation resistance characteristics of the sample was dramatically bettered.

The difference between the aluminized samples is difficult to understand in FIG. 7. FIG. 8 shows an enlarged view of FIG. 7.

The sample prepared by aluminizing the mixed powder of the Ni—Al alloy where Al was 40 atomic % or 50 atomic %, and alumina wore less than the sample prepared by aluminizing Fe-65Al alloy powder and Ni-35Al composite powder shown in Patent Reference 1. This indicates that the Fe-containing film degrades faster than the Fe-free film. When the mixed powder of Ni—Al alloy where Al was 60 atomic % and alumina was aluminized, a brittle Al-rich film formed, and the film readily cracked to accept oxygen penetration thereinto, whereby the oxidation of the film was promoted. This verifies the effectiveness of the mixed powder of Ni—Al alloy and alumina of the present invention.

COMPARATIVE EXAMPLE 1

In Comparative Example 1, production of an alloy powder by heating was tried, using a commercially-available Ni-35Al (atomic %) composite powder. In the Ni—Al composite powder, the surface of the Al particle is coated with Ni, and Ni and Al do not form an alloy. The Ni—Al composite powder was put into a crucible, and in a vacuum condition of $8.4\times10^{-2}$ Pa in a vacuum heating furnace, this was heated up to 1200° C. at 10° C./min and kept as such for 12.5 hours, and thereafter cooled. After fully cooled, grinding the sample in a mortar was tried to give a powder.

FIG. 9 shows a photograph of the obtained product. This was clumpy, and even though grinding the clump with a hammer was tried, the clump could not be ground except a part thereof. This is because, in this, the reaction of Ni and Al was not uniform, and a part of the product was Ni solid solution with an extremely high ductility, while a part thereof was an Al-rich intermetallic compound (for example, Ni$_2$Al$_3$, etc.) not so much sticky. Accordingly, it has been confirmed that heating an Ni—Al composite powder could not provide an Ni—Al alloy powder.

Needless-to-say, the present invention is not limited to the above-mentioned Examples, and the invention accepts various modifications in point of the details thereof.

What is claimed is:

1. A method for producing an alloy material, comprising immersing an Ir-based alloy material or Ru-based alloy material that contains at least one of Al, Sc, Ti, V, Cr, Mn, Y, Zr, Nb, Mo, Tc, Hf, Ta, W or Re within a quantitative range within which any precipitation phase does not form, in a second mixed powder prepared by adding a metal chloride powder or an ammonia chloride powder to a mixed powder of a Ni—Al alloy and alumina, in an amount falling within a range of from 1% by mass to 6% by mass, at a temperature falling within a range of from 800° C. to 1300° C. for from 2 hours to 6 hours, thereby forming an IrAl intermetallic compound film or RuAl intermetallic compound film on a surface of the Ir-based alloy material or Ru-based alloy material, wherein the mixed powder of a Ni—Al alloy and alumina is prepared at least by heating a first mixed powder, which is prepared by mixing a Ni—Al mixed powder as prepared by mixing an Al powder with Ni in such a manner that Al therein could fall within a range of from 25 atomic % to 60 atomic %, and an alumina powder in a range of from 40% by mass to 60% by mass, in vacuum or in an inert gas atmosphere at a temperature falling within a range of from 600° C. to 1300° C. for at least 1 hour, and then grinding a resulting product.

* * * * *